United States Patent [19]
Stripling

[11] 3,746,281
[45] July 17, 1973

[54] HYBRID STRAPDOWN GUIDANCE SYSTEM

[75] Inventor: William W. Stripling, Huntsville, Ala.

[73] Assignee: The United States of America as represented by the Secretary of the Army, Washington, D.C.

[22] Filed: Aug. 4, 1971

[21] Appl. No.: 168,883

[52] U.S. Cl. .................................................. 244/3.2
[51] Int. Cl. ............................................. F41g 7/00
[58] Field of Search ..................................... 244/3.2

[56] References Cited
UNITED STATES PATENTS

| | | | |
|---|---|---|---|
| 3,260,485 | 7/1966 | Lerman et al. | 244/3.2 |
| 3,540,678 | 11/1970 | Gottzein | 244/3.2 |
| 3,057,211 | 10/1962 | Duncan et al. | 244/3.2 |
| 3,283,573 | 11/1966 | Bishop et al. | 244/3.2 UX |
| 3,547,381 | 12/1970 | Shaw | 244/3.2 |

Primary Examiner—Benjamin A. Borchelt
Assistant Examiner—H. J. Tudor
Attorney—Harry M. Saragovitz, Edward J. Kelly et al.

[57] ABSTRACT

A guidance system for guiding a missile in its boost phase. The system uses a two-axis spaced-fixed platform with pitch and yaw gimbals controlled by a dual-axis gyro that is mounted on the platform. A single-axis roll gyro is strapped-down to the missile frame for controlling the missile in roll. The platform is controlled in roll by the missile frame. The system has three accelerometers on the platform, two being a part of the dual-axis gyro for sensing acceleration in pitch and yaw, and the third being a range accelerometer for sensing acceleration along the longitudinal axis of the missile. The sensed pitch and yaw acceleration voltages are processed in a guidance computer and are compared therein with programmed flight path voltages. If there is any difference between corresponding voltages in pitch and yaw, corrective guidance command signals are generated. The guidance command signals are fed to a pitch-and-yaw signal processor for processing. This processor provides as outputs command signals to airframe actuators for guiding the missile in pitch and yaw. Output signals from the roll gyro are likewise applied, through a roll control signal processor, to the same airframe actuators for guiding the missile in roll. The pitch and vertical acceleration voltages are so processed in the guidance computer that an engine cut-off signal is generated at the proper time.

3 Claims, 4 Drawing Figures

William W. Stripling,
INVENTOR

HYBRID STRAPDOWN GUIDANCE SYSTEM

BACKGROUND OF THE INVENTION

In guiding a ground-to-ground missile during the boost phase of flight, it is desired that the missile arrive at an engine cut-off point with a certain attitude and velocity. The missile then follows a free flight trajectory to the target. The orientation of the missile during this boost phase must be controlled in roll, pitch and yaw for arriving at this engine cutoff point with proper speed and attitude. The missle usually begins its trajectory by rising vertically for a few seconds. It then rolls to the proper heading. Once in the proper roll direction, the missile executes its pitch maneuver. The flight of the missile can be considered to pitch-over down range in one vertical plane with no acceleration in a traverse direction.

One commonly used means of guiding a missile in such a vertical liftoff boost phase uses a strapdown, i.e., hard-mounted to the missile frame, three-axis inertial system for guiding the missile in roll, pitch, and yaw. Strapdown systems such as this place stringent requirements on the gyro dynamic range performance in maintaining a space fixed reference in a guided missile. A three-axis platform may use three single-degree-of-freedom gyros arranged orthogonally in such a way that the spin axes of two of the gyros are in parallel planes. Any angular motion of the platform about the input axis of either of these gyros having spin axes in a parallel plane is sensed by the pickoff of the other gyro.

The basic improvement that the present system allows over a conventional three-axis platform is the simplification of using the missile frame as a third gimbal for maintaining alignment of the accelerometer in a specific inertial reference frame. When a two-axis platform having a two-degree-of-freedom gyro and accelerometer with input axes aligned with the pitch and yaw axes is augmented by a strapdown single-degree-of-freedom gyro in the roll axes, a simple three-axis control system is provided that can be made more compact than present three-axes control systems.

SUMMARY OF THE INVENTION

The present invention is a hybrid two-axis space-fixed platform and strapdown single-axis roll gyro guidance system combined for use in guiding a missile during its boost propulsion phase of operation. The strapdown roll gyro is a single-degree-of-freedom gyro that has its input axis aligned with the longitudinal axis of the missile for sensing missile roll and having an output to controls for aerodynamic surfaces. These surfaces keep the missile roll-stabilized. The platform is controlled in roll by the missile airframe. The two-axis space-fixed platform has a two-degree-of-freedom gyro and accelerometer with its two input axes aligned with the pitch and yaw axes of the missile.

The guidance of the missile is based upon output signals from three accelerometers, all mounted on the space-fixed platform with their sensitive axes mutually perpendicular. The output signals from the accelerometers are applied to a guidance computer. Two of the accelerometers, whose input axes are oriented in pitch and yaw, are a part of a two-degree-of-freedom gyro and accelerometer. A range accelerometer is positioned separately on the space-fixed platform for sensing vertical acceleration of the missile. Output signals from the accelerometers are compared with programmed flight path signals in the guidance computer. If there are any differences between the actual and the programmed pitch and yaw voltages, guidance command signals are generated, and are applied to a pitch and yaw signal processor. In the signal processor, the command signals are compared to the actual pitch and yaw signals as derived from transducers between the space-fixed platform and the missile airframe. The differences between the compared signals are applied to airframe actuators as command signals. The airframe actuators move aerodynamic control surfaces for guiding the missile according to the desired flight path. The pitch and vertical acceleration voltages are processed in the guidance computer for generating an engine cut-off signal at a prescribed velocity when the missile is in a prescribed attitude. The missile is then in a free flight trajectory to the target.

DESCRIPTION OF THE PREFERRED EMBODIMENT

Figure 1:
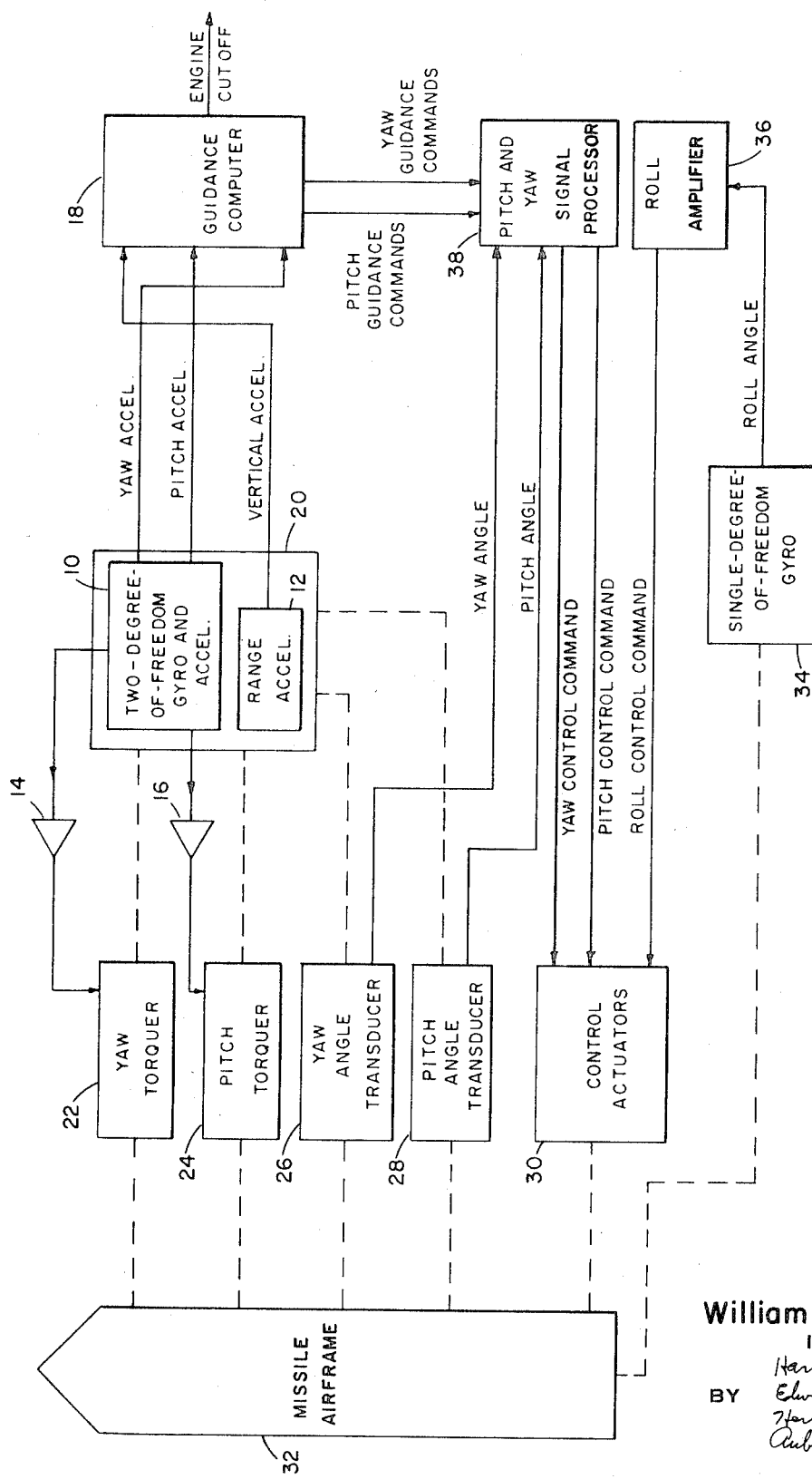
FIG. 1 is a block and flow pattern diagram illustrating the invention.
Figure 2:
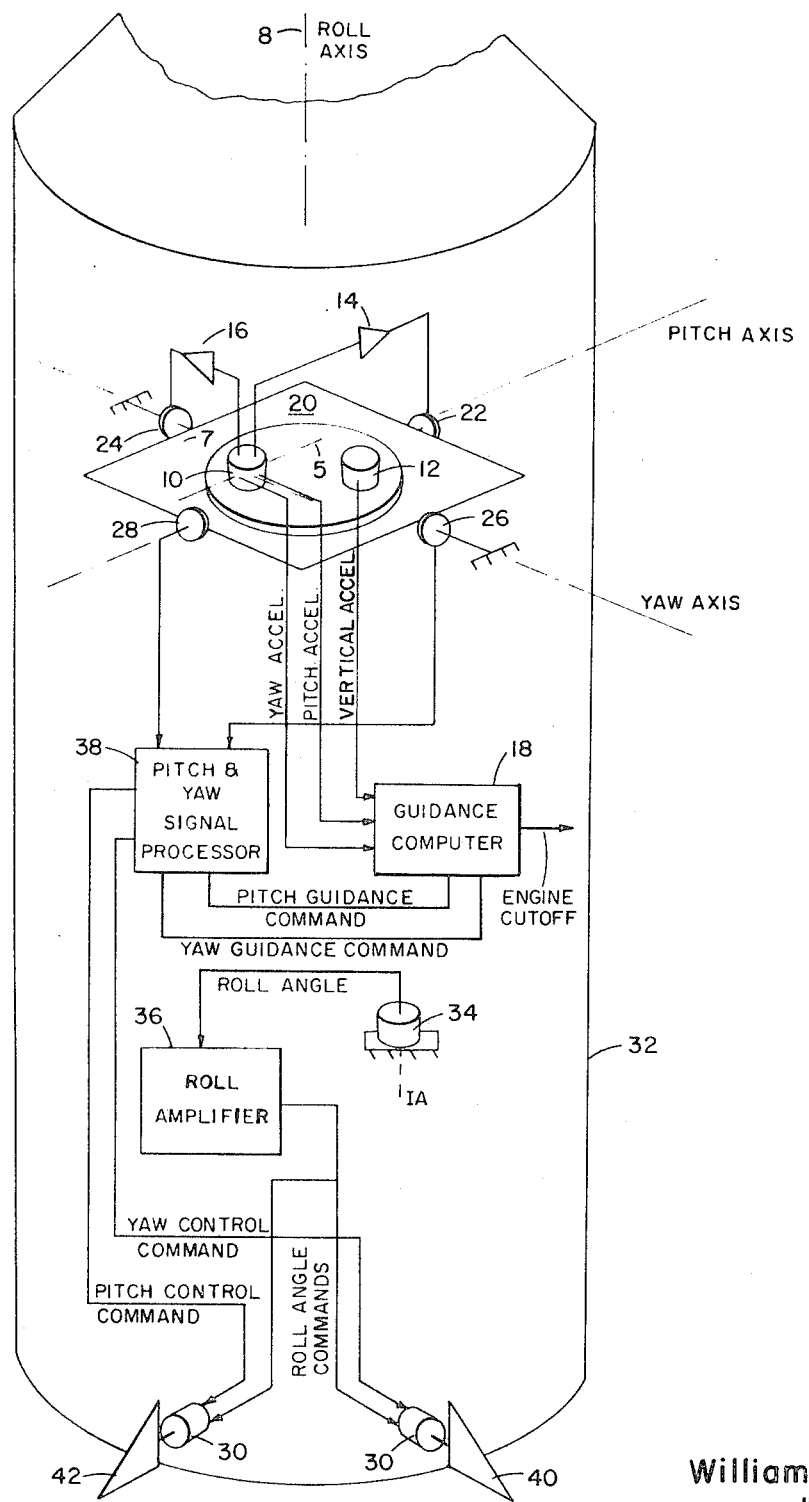
FIG. 2 is a schematic diagram illustrating the missile mounting arrangement of the hybrid system gyros and accelerometers of the present invention.

Referring to FIGS. 1 and 2, a two-axis space-fixed platform 20 is shown mounted within missile 32. Platform 20 has a two-degree-of-freedom gyro and accelerometer 10 and a range accelerometer 12 mounted thereon. Device 10 has sensitive axes 5 and 7 (FIG. 2). Axis 5 is positioned parallel with the pitch axis of the missile, and axis 7 is positioned parallel with the yaw axis of the missile. A single-degree-of-freedom gyro 34 is separately strapped-down to the frame of the missile with its input axis IA aligned parallel with the longitudinal or roll axis 8 of the missile. Platform 20 is then controlled in roll by the missile frame. Roll gyro 34 produces voltages at its output in the conventional manner. These voltages are amplified in roll control signal processor 36 to provide roll angle command signals. These roll angle command signals are applied to actuators 30 that, in turn, move aerodynamic surfaces 40 and 42 to move missile 32 in roll.

A typical two-degree-of-freedom gyro and accelerometer device, such as device 10, that may be used in this invention is disclosed on page 97 of the June 1968 edition of the periodical "Space Aeronautics", published by Conover-Mast Publication, Inc., New York City. This article is entitled, "New Class of Inertial Sensors Combines Wide Range with Small Size " and was written by W. G. James. When missile 32 is positioned for a vertical launch, input axes 5 and 7 may be respectively aligned parallel to the pitch and yaw axes of missile 32. Platform 20, on which device 10 is mounted, remains space-fixed after launch and estabilshes a reference plane to indicate the space orientation of missile 32 about this platform during the flight. The gyro outputs from device 10 are applied to pitch and yaw torquers 24 and 22, through amplifiers 16 and 14, respectively, for maintaining platform 20 space-fixed after missile launch. The outputs from the accelerometer of device 10 are analog signals in pitch and yaw that are applied to guidance computer 18 for comparison with programmed flight paths in pitch and yaw within the computer. The value of these analog signals at the outputs of the accelerometers are the actual acceleration of the missile in pitch and yaw, and if these outputs are not identical to the programmed flight path equations, then error signals, called pitch and yaw guidance command signals, are generated at the output of computer 18. Range accelerometer 12 further provides a vertical acceleration signal for missile 32. This vertical acceration tion signal is also applied to guidance computer 18. The vertical acceleration, pitch acceleration, and yaw acceleration signals are applied to guidance computer 18. An engine cut-off signal and pitch and yaw guidance commands are derived in 18.

Figure 3:
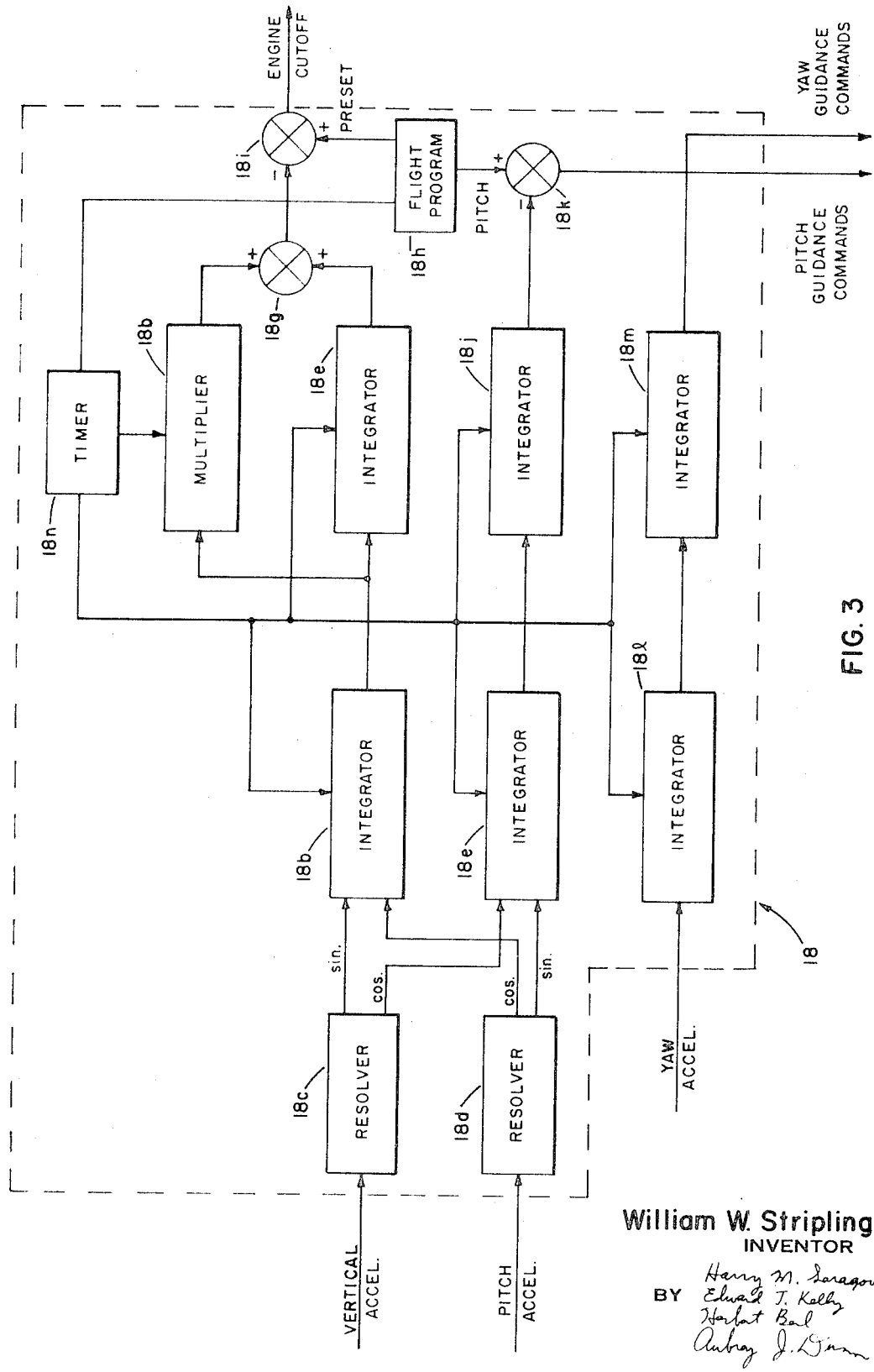
FIG. 3 is a block schematic diagram of the elements in the guidance computer of FIGS. 1 and 2.

The elements of computer 18 are shown in FIG. 3 in block diagram form. Guidance computer 18 may be similar to a system shown and described on pages 123-127 in a book entitled "Navigation and Guidance in Space", by Edward V. B. Stearns by Prentice-Hall Inc., Copyright 1963. Another reference of a computer such as guidance computer 18 is shown and described on page 273 of a book entitled "Inertial Guidance", by George R. Pitman, Jr., by John Wiley & Sons Inc., Copyright 1962. The elements are described hereinbelow with reference to the blocks shown in FIG. 3. If missile 32 moves laterally along axis 5, an acceleration signal is detected and a pitch acceleration output signal is produced from device 10. This pitch acceleration output signal is applied to a first resolver 18a. The output of 18a consists of a sine portion and a cosine portion. The sine portion is applied to one input to integrator 18b, and the cosine portion is applied to one input of integrator 18c. Pitch acceleration signals are applied to resolver 18d. The output of 18d has sine and cosine portions respectively applied to inputs of 18c and 18b. The output of integrator 18b is applied to integrator 18e and multiplier 18f. The output of 18b is related to vertical velocity, therefore, the output of 18e is related to vertical displacement. Multiplier 18f amplifies the velocity signal from 18b by a factor dependent on "time-to-go" to impact. The outputs from 18f and 18e are summed in summer 18g. The output of 18g is subtracted from a constant preset signal provided by flight program generator 18h in subtractor 18i.

The output of 18i feeds a zero-detector (not shown) which detector cuts off the missile engine when the output from 18i goes to zero.

The output of 18c is related to pitch velocity. When this output is integrated in integrator 18j, an output related to pitch displacement is provided. This output from 18j is subtracted from a pitch output of flight program generator 18h in subtractor 18k. The variable output of 18k provides pitch guidance commands.

For yaw commands, the yaw acceleration signals are merely twice integrated in integrators 18l and 18m.

As can be seen in FIG. 3, integrators 18b, and 18c, 18e, 18j, 18l and 18m, multiplier 18f and flight program generator 18h are all timed by timer 18n. The outputs of 18n can be digital or analog. If digital, multiplier 18f could include a counter having a preset count at liftoff of the missile, which count would be varied by pulses from 18n. Likewise, the variable output of 18k could be controlled in a similar manner. It would obviously be necessary to convert the guidance commands into analog signals.

Figure 4:
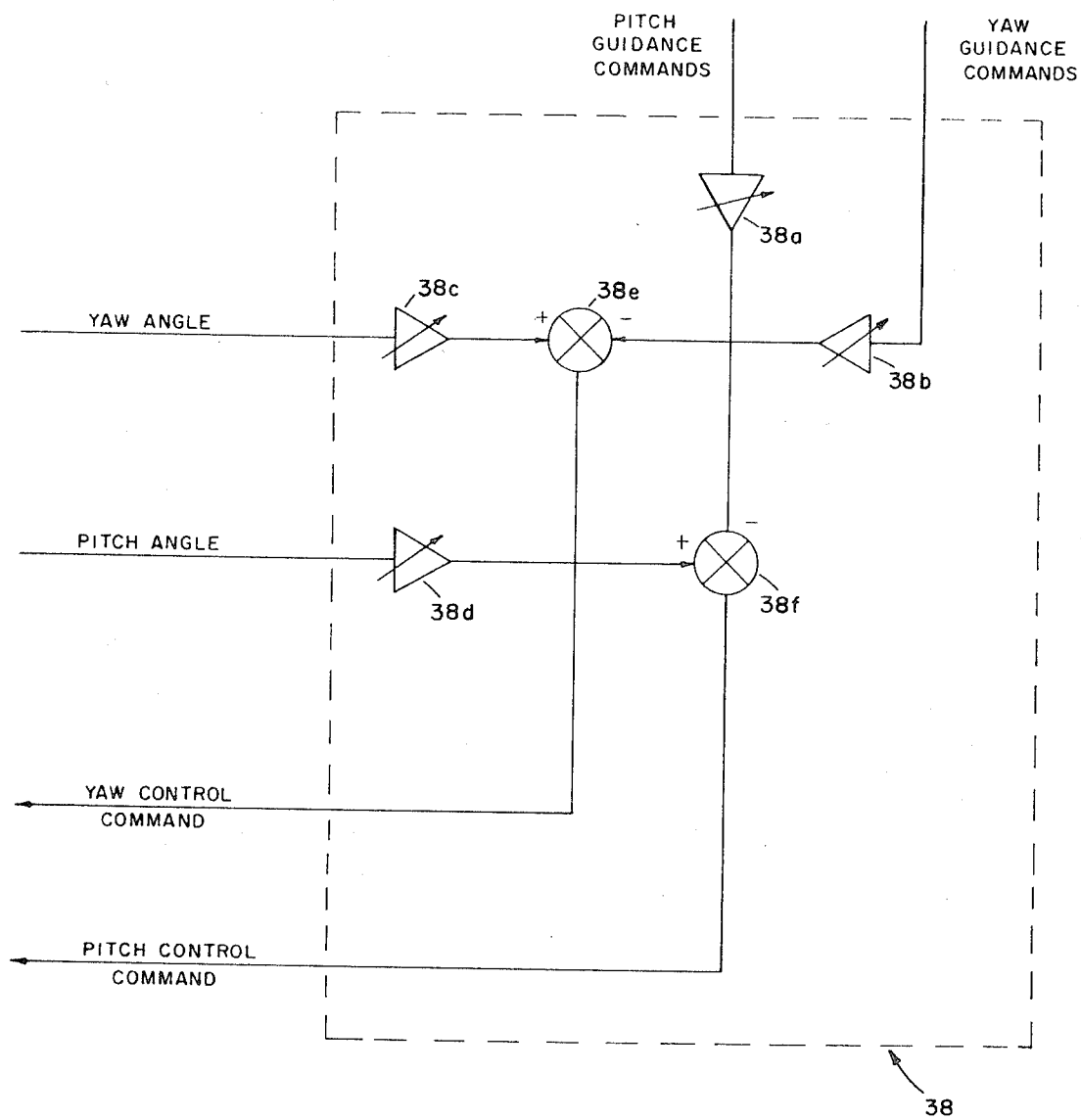
FIG. 4 is a schematic block diagram of one of the signal processors of FIGS. 1 and 2.

The command signals are applied to first and second inputs of pitch and yaw control signal processor 38 as shown in FIGS. 1 and 2, and as shown in detail in FIG. 4.

As can be seen in FIG. 4, signal processor 38 includes variable amplifiers 38a and 38b to which the pitch and yaw guidance commands are respectively applied. The pitch angle and yaw angle transducers (26 and 28) of FIGS. 1 and 2 produce variable voltages related to the angles between space-fixed platform 20 and missile airframe 32. These variable voltage outputs from transducers 28 and 26 represent pitch and yaw alignment, respectively, and are fed to third and fourth inputs, of pitch and yaw control signal processor 38. The third input of 38 goes to variable amplifier 38c and the fourth input goes to amplifier 38d. The outputs from amplifiers 38b and 38c are combined in subtractor 38e to provide a yaw control command. The outputs of 38a and 38d are combined in subtractor 38f to provide a pitch control command.

Roll control of the missle is accomplished by amplifying the output of gyro 34 in amplifier 36, and applying the output of 36 to control actuator 30.

The control command signals are fed to airframe control actuators 30. The actuators 30 furnish signals in pitch to a pitch aerodynamic control surface 42 and signals in yaw to a yaw aerodynamic control surface 40. Only one each of surfaces 40 and 42 are shown, but there are like surfaces 180° apart on missile 32 surface. The use of four aerodynamic control surfaces is not critical in the present guidance system, since three aerodynamic control surfaces are frequently used in guiding a missile. However, by using four airframe control acutators and four control surfaces, the pitch, yaw and roll control command signals may be summed directly. The use of three airframe control actuators and aerodynamic control surfaces would require the summing of the sine and cosine components of the pitch, yaw and roll control command signals within the three airframe control actuators.

While a specific embodiment of the invention has been shown and described, other embodiments may be obvious to one skilled in the art in light of this disclosure. An example is that the space-fixed platform could be oriented such that the range accelerometer would be aligned parallel to the slant range velocity vector, instead of perpendicular to the longitudinal axis of the missile as described. It should be emphasized the elements 18 and 38 are considered as old and well known in the art and their exact contents are not limited to the contents of FIGS. 3 and 4. The gains of the amplifiers in element 38 would be manually adjusted prior to launch of the missile, in accordance with the particular mission of the missile.

I claim:

1. A missile with an airframe and a guidance system comprising: a space-stable platform in said missile; means mounted on said platform for sensing pitch and yaw acceleration and providing pitch and yaw acceleration signals; means mounted on said platform for sensing vertical acceleration of said platform and for providing a vertical acceleration signal; a guidance computer having inputs to which said pitch, yaw, and vertical acceleration signals are applied and having respective outputs for a missile engine cut-off signal, for pitch guidance signals and for yaw guidance signals; first and second transducers mounted between said stable platform and the airframe of said missile for respectively responding to the angles between said platform and pitch and yaw axes and for providing respective pitch and yaw angle signals; a signal processor having respective inputs for each of said pitch and yaw guidance signals, and said pitch and yaw angle signals, said processor also having respective outputs for pitch and yaw command signals; a sensor mounted on said missile airframe for sensing roll of said missile about its longitudinal axis and for providing a signal related to the roll angle; a plurality of aerodynamic control surfaces on said missile airframe; and a respective plurality of actuators for said control surfaces, with said pitch and yaw command signals applied to respective inputs of said actuators, and with said roll signal applied to inputs of said actuators.

2. The system of claim 1 wherein said guidance computer includes means to provide a pitch dispacement reference signal and a vertical displacement reference signal; means for deriving pitch and vertical displacement signals from said pitch and vertical acceleration signals; and means for comparing said reference signals and the derived signals to provide the engine cut-off and pitch guidance commands; and further means in said computer for deriving from said yaw acceleration signals yaw displacement signals as yaw guidance command signals.

3. The system of claim 2 wherein said pitch and yaw signal processor includes means for respectively comparing said pitch commands and said pitch angle signals and said yaw guidance commands and said yaw angle signals to provide respectively said pitch and yaw control commands.

* * * * *